United States Patent
Parsons et al.

(10) Patent No.: US 11,946,715 B2
(45) Date of Patent: Apr. 2, 2024

(54) METHOD OF MAKING A TRAINING FIREARM

(71) Applicant: Armament Systems and Procedures, Inc., Appleton, WI (US)

(72) Inventors: Kevin Parsons, Appleton, WI (US); Jilene H. Beyer, Neenah, WI (US)

(73) Assignee: ARMAMENT SYSTEMS AND PROCEDURES, INC., Appleton, WI (US)

( * ) Notice: Subject to any disclaimer, the term of this patent is extended or adjusted under 35 U.S.C. 154(b) by 556 days.

(21) Appl. No.: 17/150,215

(22) Filed: Jan. 15, 2021

(65) Prior Publication Data

US 2022/0228832 A1     Jul. 21, 2022

(51) Int. Cl.
| | |
|---|---|
| *F41A 33/00* | (2006.01) |
| *B29C 39/10* | (2006.01) |
| *B29C 69/00* | (2006.01) |
| *B29K 705/00* | (2006.01) |
| *B29L 31/00* | (2006.01) |

(52) U.S. Cl.
CPC ............ *F41A 33/00* (2013.01); *B29C 39/10* (2013.01); *B29C 69/004* (2013.01); *B29K 2705/00* (2013.01); *B29L 2031/777* (2013.01)

(58) Field of Classification Search
CPC ................. F41A 9/59; B29L 2031/777; B29L 2031/7772
See application file for complete search history.

(56) References Cited

U.S. PATENT DOCUMENTS

| | | | | |
|---|---|---|---|---|
| 3,889,918 | A * | 6/1975 | Stoeberl ............... | B29C 65/56 164/332 |
| 5,451,162 | A * | 9/1995 | Parsons ................ | F41A 33/00 434/16 |
| 10,969,185 | B2 * | 4/2021 | Green ................... | F41A 33/00 |
| 11,204,214 | B2 * | 12/2021 | Kirsch .................. | F41A 9/65 |
| 2004/0244254 | A1 * | 12/2004 | Barfield ................ | F41A 11/00 42/72 |
| 2005/0188586 | A1 * | 9/2005 | Barfield ................ | F41A 17/00 42/71.01 |
| 2017/0072600 | A1 * | 3/2017 | Johnson, Jr. ........ | F41A 3/66 |

(Continued)

FOREIGN PATENT DOCUMENTS

| | | | | |
|---|---|---|---|---|
| DE | 102006045369 A1 * | 4/2008 | ........ | B29C 45/0062 |
| JP | 2004136532 A * | 5/2004 | ........ | B29C 45/0062 |
| PL | 229519 B1 * | 7/2018 | | |

OTHER PUBLICATIONS

Patent Office of the Republic of Poland. "Translation of Abstract for P.289793: Method of jointing composite shells in particular those forming lifting surface of aerofoils and apparatus therefor." Accessed Oct. 2023. https://ewyszukiwarka.pue.uprp.gov.pl/search/pwp-details/P.289873?lng=en (Year: 2023).*

(Continued)

*Primary Examiner* — Emmanuel S Luk
*Assistant Examiner* — Jonathan B Woo
(74) *Attorney, Agent, or Firm* — Hahn Loeser & Parks LLP

(57) ABSTRACT

A method is described of making a training firearm that has a replaceable magazine. The training firearm is not an actual firearm but possesses a visual look and tactile fee of an actual firearm, to enable a user to train realistically but safely.

20 Claims, 4 Drawing Sheets

(56) References Cited

U.S. PATENT DOCUMENTS

2018/0128570 A1* 5/2018 Sawicki .................. F41A 17/44

OTHER PUBLICATIONS

Patent Office of the Republic of Poland. "21/1992, P003—Applications for inventions or utility models." Accessed Oct. 2023. https://api-ewyszukiwarka.pue.uprp.gov.pl/api/collection/1319f4e1134ca4df307a919bd9579712#search=289873 (Year: 1992).*
Koziol M et al. "English Machine Translation of PL229519B1: Method for making a product from the fibre-resin composite." 2023. EPO. Espacenet. (Year: 2023).*
Koziol M et al. "English Machine Translation of DE102006045369A1: Production of hollow moldings with thin film on inner surface comprises injection molding." 2023. EPO. Espacenet. (Year: 2023).*
Koziol M et al. "English Machine Translation of JP2004136532A: Method for Injection-Molding Multi-Layer Hollow Body, and Mold for Injection Molding." 2023. EPO. Espacenet. (Year: 2023).*

* cited by examiner

METHOD OF MAKING A TRAINING FIREARM

FIELD OF THE INVENTION

The invention generally relates to a method of making a training firearm that has a replaceable magazine. The training firearm is not an actual firearm but possesses a visual look and tactile fee of an actual firearm, to enable a user to train realistically but safely.

BACKGROUND

The use of actual firearms during training often results in avoidable injuries. Consequently, it is safer to train in the accessing, handling and holstering of firearms using a training firearm, that is not an actual firearm but possesses a visual look and tactile feel of an actual firearm. This enables one to train realistically but safely.

Ideally, such a training firearm replicates the appearance and handling characteristics of an actual firearm, fits perfectly into a trainee's service weapon holster, and has long-term durability, but also facilitates training for safely handling, transporting, retaining, and presenting firearms.

BRIEF DESCRIPTION OF THE DRAWINGS

While embodiments can take many different forms, specific embodiments are shown in the drawings and will be described with the understanding that the present disclosure is an exemplification of the principles of the present invention and the best mode of practicing it. No limitation to a specific embodiment illustrated is intended. The following drawings are not necessarily drawn to scale.

DETAILED DESCRIPTION

Figure 1:
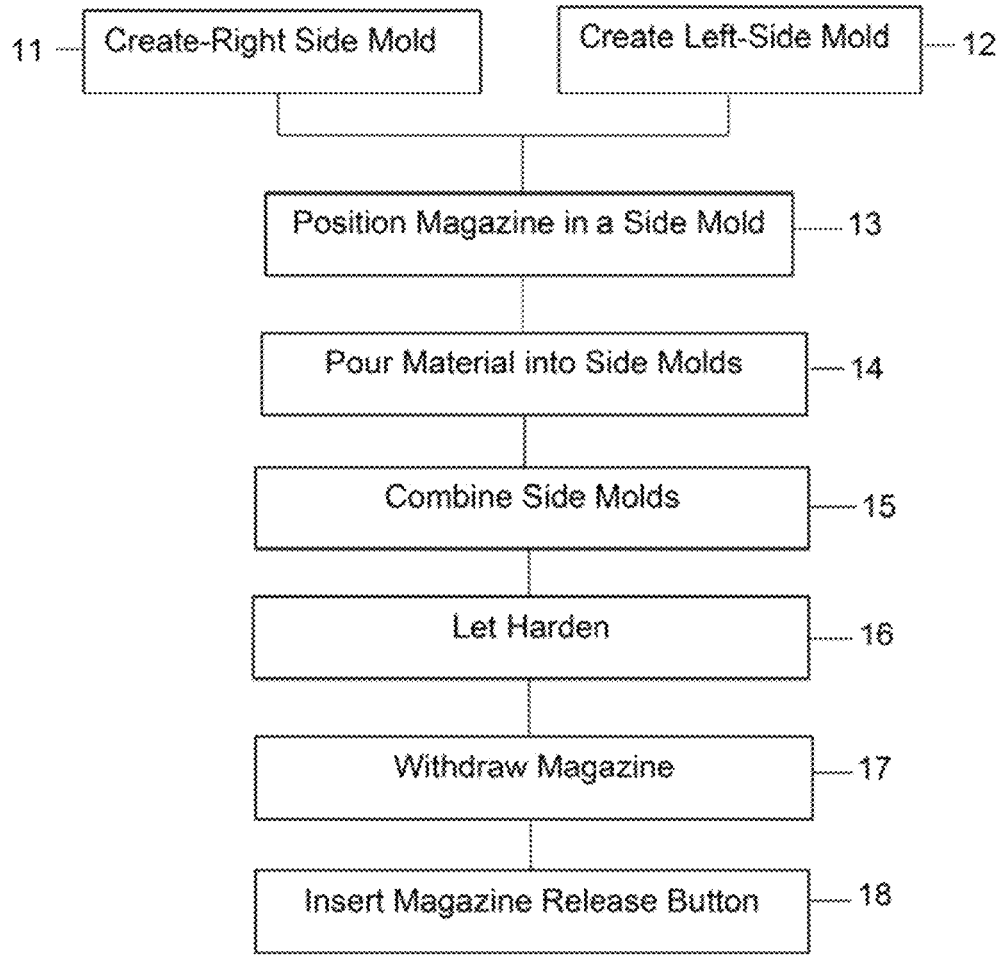
FIG. 1 is a flow chart of an exemplary method of making a training firearm that has a replaceable magazine.
Figure 1:
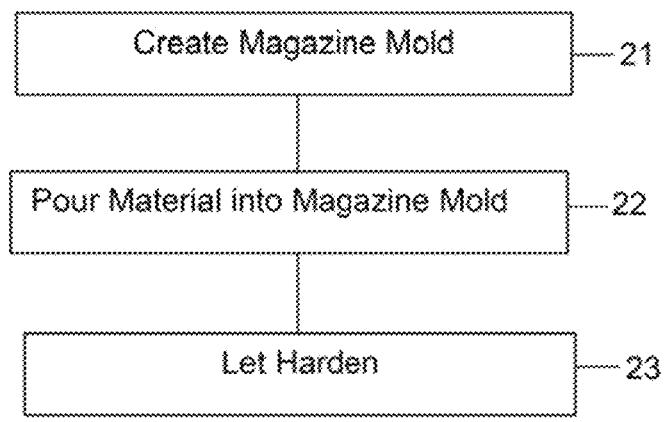

FIG. 1 is a flow chart of an exemplary method of making a training firearm that has a replaceable magazine, Any actual firearm can be replicated by a training firearm, including any number of pistols or other handguns or side arms, rifles or other shoulder weapons, and so forth.

An exemplary method of making a training firearm comprises creating (1 and 12) permanent open cavity molds of the right and left sides of an actual firearm being replicated. Basing the mold on an actual firearm facilitates replicating the details of the original firearm, and makes use of the training firearm more realistic.

The illustrated exemplary method comprises positioning (13) a magazine (or a replica of the magazine) of the actual firearm being replicated in one of the permanent open cavity molds. In a preferred embodiment, a magazine (or replica of the magazine) is positioned in only one of the permanent open cavity molds, and is done so before a material is poured into the mold. The other half of a magazine well is formed when right and left side poured replicas are combined. However, in other embodiments, magazines (or replicas) could be positioned in the open cavity mold of each side of the firearm, and/or a magazine or magazines (or replica(s)) could be positioned in a mold or molds after a material is poured into the molds.

The magazine (or replica of the magazine) typically should be pre-hardened, or should be coated (such as with a silicon coating) to inhibit fusing of the magazine (or replica of the magazine) with the material from which the training firearm is being molded. This facilitates withdrawal of the magazine (or replica of the magazine) from the fused replica resulting from fusing of the right and left side poured replicas.

The exemplary method comprises pouring (14) a material into each of the permanent open cavity molds to create right and left side poured replicas, respectively, of the right and left sides of the actual firearm being replicated. Various materials may be used including different polymers, metals or alloys. A preferred material is a high impact polymer which is durable but relatively inexpensive. It also is preferred that the chosen material have a distinctive color, such as red, that provides instant recognition that the fused replica is a safe training firearm rather than an actual firearm.

Figure 6:
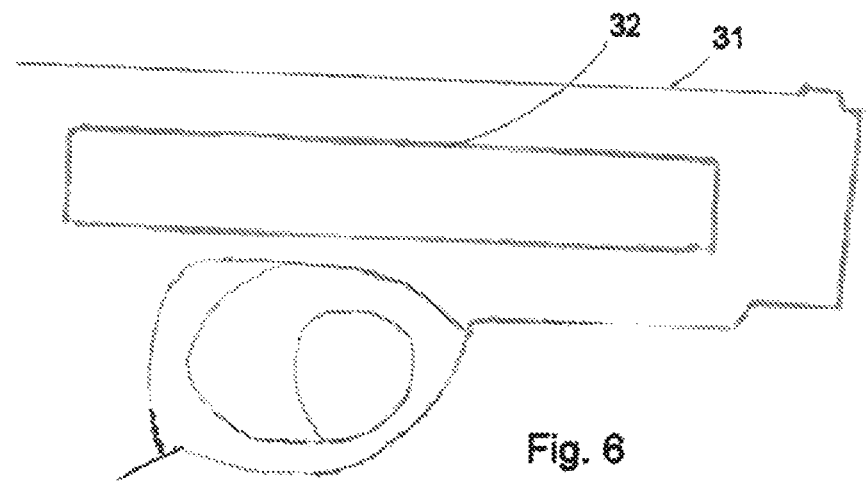
FIG. 6 is an exemplary schematic representation of part of a left side poured replica of a training firearm, with an inserted weight.

In some embodiments, a weight 32 is inserted into one or both of the permanent open cavity molds. FIG. 6 is an exemplary schematic representation of part of a left side poured replica 31 of a training firearm, with an inserted weight 32. The weight 32 can be any heavy material, preferably a metal such as steel, most preferably a steel reinforcing bar. In the case of a polymer fused replica, the weight 32 makes the weight of the training firearm closer to that of the actual firearm being replicated, which enhances the training value. The weight 32 also increases the durability of the training firearm, and may be positioned to move the center of gravity of the training firearm closer to the center of gravity of the actual firearm being replicated.

The exemplary method comprises combining (15) the right and left poured replicas to fuse them together, and letting them harden (16) to create the fused replica.

The exemplary method comprises withdrawing (17) the magazine (or replica of the magazine) from the combined right and left side pour relicas. This leaves a magazine well 71 in a space where the magazine (or replica of the magazine) had been located before being withdrawn.

Figure 2:
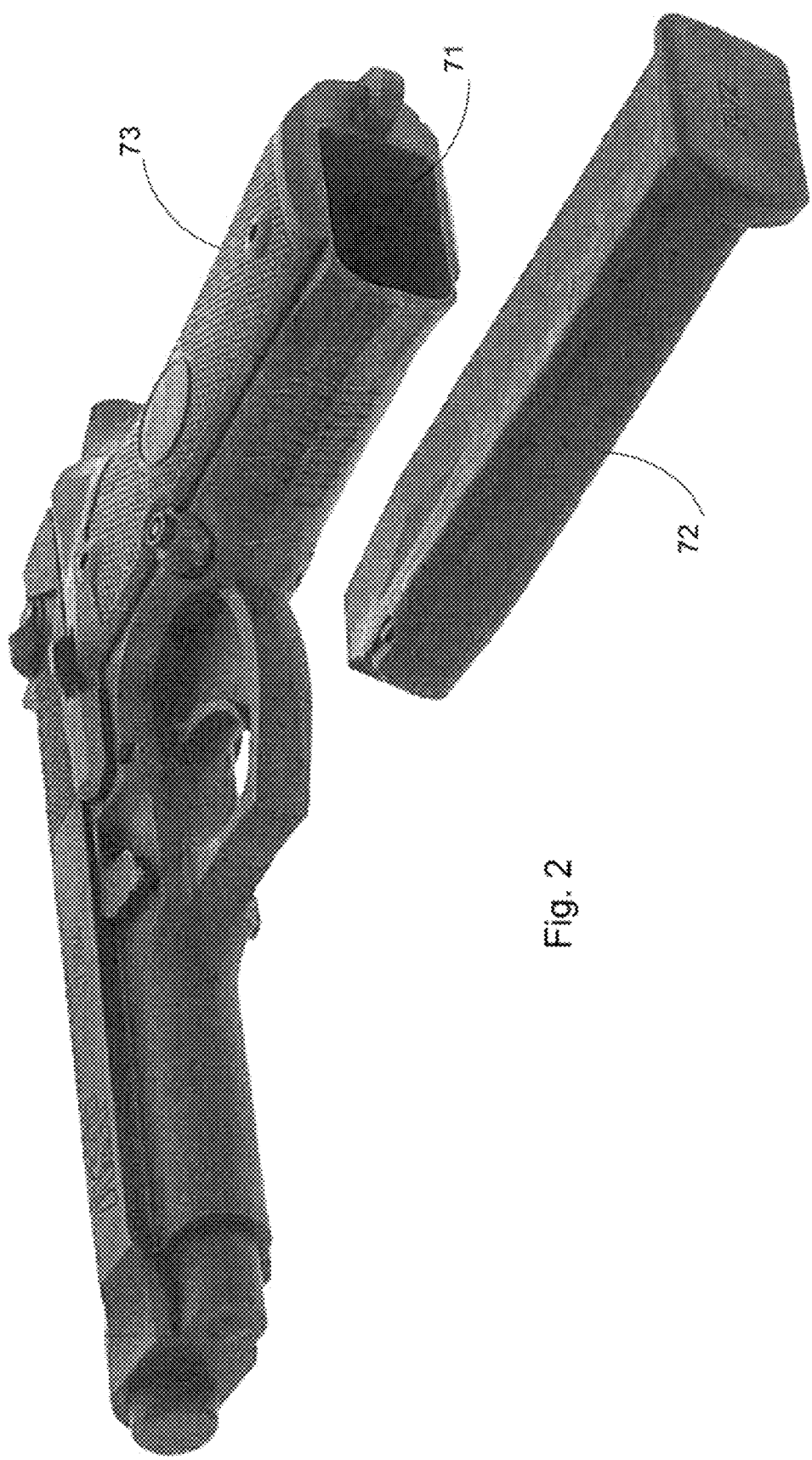
FIG. 2 shows an exemplary training firearm with its training magazine removed.

The exemplary method comprises forming a training magazine for use with the training firearm. This comprises creating (21) a training magazine mold of the magazine (or replica of the magazine), pouring (22) a material into the training magazine mold and letting it harden (23). FIG. 2 shows an exemplary training firearm 73 with its training magazine 72 removed from its magazine well 71. The training magazine 72 is dimensioned for insertion into the magazine well 71 of the fused replica resulting from the combining (15) and hardening (16) of the right and left poured replicas and the withdrawal (17) of the magazine (or replica of the magazine). The training magazine 72 is insertable into the magazine well 71, releasable from the magazine well 71, and replaceable. Various materials may be used for the training magazine 72 including different polymers, metals or alloys. A preferred material is a polymer which is durable but relatively inexpensive. In addition, a weight (such as a metal, for example) is inserted into the training magazine mold in some embodiments. Interchangeable training magazines 72 are made with or without the weight, to simulate, respectively, a magazine with or without ammunition.

The exemplary method comprises inserting (18) a magazine release button in the fused replica. The magazine release button and the training magazine 72 comprise respective mating features that engage to lock the training magazine 72 in the magazine well 71 unless the magazine release button is activated.

Figure 3:
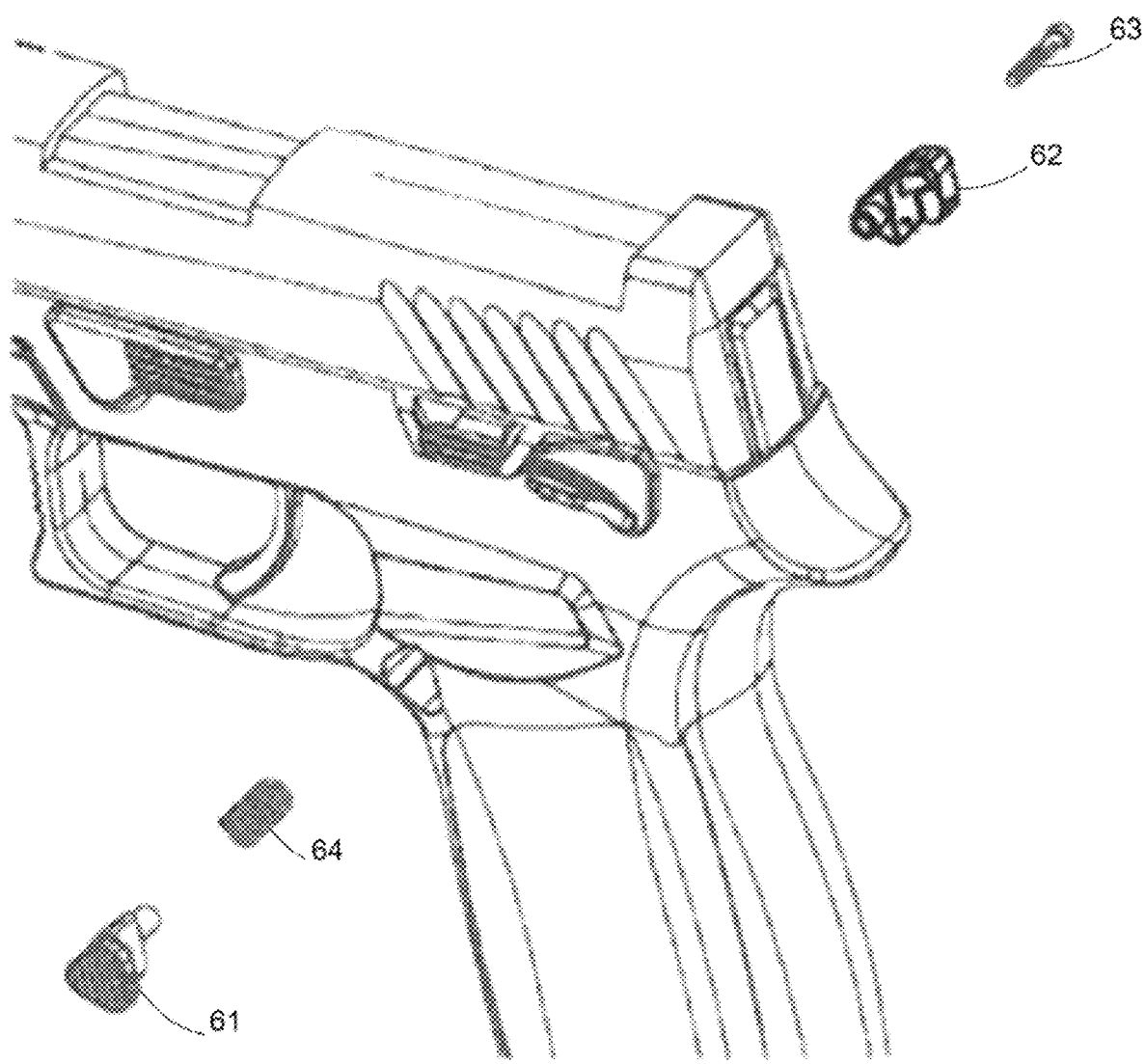
FIG. 3 shows part of an exemplary firearm with a disassembled magazine release button.
Figure 4:
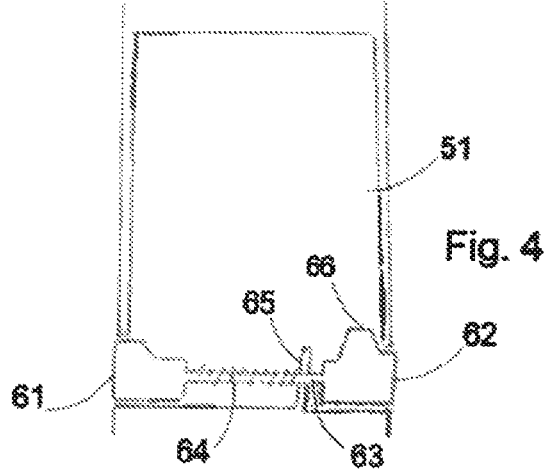
FIG. 4 is an exemplary schematic representation of a cross-section of a magazine well and a magazine release button for a training firearm.
Figure 5:
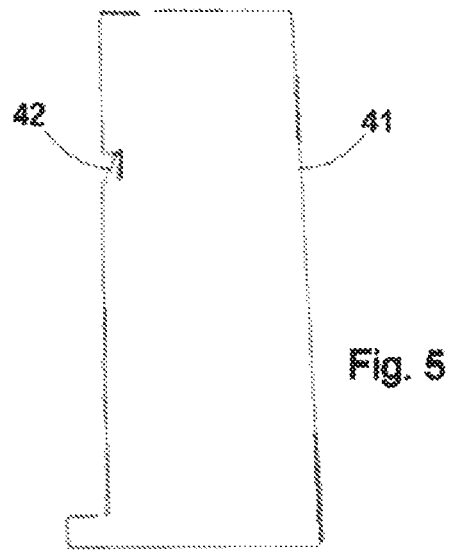
FIG. 5 is an exemplary schematic representation of a side view of a training magazine.

One exemplary embodiment is illustrated in FIGS. 3-5. FIG. 3 shows part of an exemplary firearm with a disassembled magazine release button. FIG. 4 is an exemplary schematic representation of a cross-section of a magazine well 51 and a magazine release button for a training firearm. FIG. 5 is an exemplary schematic representation of a side view of training magazine 41 for a training firearm.

For at least this exemplary embodiment, at least one of steps of creating a permanent open cavity mold of a right or left side of the actual firearm being replicated, in the method of making the training firearm, comprises blocking out a path in the corresponding permanent open cavity mold. That path is dimensioned to create a magazine release button channel into which a magazine release button is inserted.

For this exemplary embodiment, the method of making the training firearm comprises the step of creating the right side permanent open cavity mold comprising blocking out a first path in the right side mold that is dimensioned to create a right side of a magazine release button channel; and the step of creating the left side permanent open cavity mold comprising blocking out a second path in the left side mold that is dimensioned to create a left side of the magazine release button channel. The fusing of the right and left side poured replicas results in a fused replica with a magazine release button channel, and the method of making the training firearm comprises inserting (18) the magazine release button into the magazine release button channel.

For at least this exemplary embodiment, the magazine release button comprises a right side 62, a left side 61, and a shaft 63 that joins the right and left sides (62 and 61) of the magazine release button. The inserting step (18) comprises inserting the right side 62 of the magazine release button into the right side of the magazine release button channel through a right side of the fused replica, inserting the left side 61 of the magazine release button into the left side of the magazine release button channel through a left side of the fused replica, and joining the right and left sides (62 and 61) of the magazine release button with the shaft 63.

For this exemplary embodiment, the magazine release button also comprises a spring 64 surrounding or adjacent to the shaft 63. The method of making the training firearm comprises one of the steps of creating the right or left side permanent open cavity molds further comprising leaving an opening across a part of the corresponding first or second path. Whereas the path blocks out the magazine release button channel when material is poured into the mold, the opening across part of the path results in a barrier 65 across the magazine release button channel. The shaft 63 extends through the barrier 65, but the spring 64 is restrained on one side of the barrier 65. Consequently, pressing one side of the magazine release button will compress the spring 64, biasing it to restore the magazine release button to its initial position when the magazine release button is released (as seen in FIG. 4).

For at least this exemplary embodiment, the magazine release button comprises a projection 66, and the training magazine 41 comprises an indentation 42 that is positioned and dimensioned to engage with the projection 66 to lock the training magazine 41 in the magazine well 51 unless the magazine release button is activated.

It will be understood that the disclosed methods of making a training firearm can be modified without departing from the teachings of the invention. Accordingly, the scope of the invention is only to be limited as necessitated by the accompanying claims.

What is claimed is:

1. A method of making a training firearm, the training firearm not being an actual firearm but possessing a visual look and a tactile feel of an actual firearm being replicated, to enable a user to train realistically but safely, the method comprising:
    creating a first permanent open cavity mold of a right side of the actual firearm being replicated;
    creating a second permanent open cavity mold of a left side of the actual firearm being replicated;
    positioning a magazine, or a replica of the magazine, of the actual firearm being replicated in one of the first and second permanent open cavity molds, the magazine, or the replica of the magazine, being pre-hardened or being coated to inhibit fusing of the magazine, or the replica of the magazine, with a material from which the training firearm is being molded;
    pouring the material into each of the first and second permanent open cavity molds, to create right and left side poured replicas, respectively, of the right and left sides of the actual firearm being replicated;
    combining the right and left side poured replicas to fuse them together;
    withdrawing the magazine, or the replica of the magazine, from the combined right and left side poured replicas, leaving a magazine well in a space where the magazine, or the replica of the magazine, had been located before being withdrawn.

2. The method of claim 1, the method further comprising:
    providing a training magazine that is dimensioned for insertion into the magazine well of a fused replica resulting from the fusing of the right and left side poured replicas, the training magazine being insertable into the magazine well, releasable from the magazine well, and replaceable.

3. The method of claim 2, the method further comprising providing a magazine release button in the fused replica, the magazine release button and the training magazine comprising respective mating features that engage to lock the training magazine in the magazine well unless the magazine release button is activated.

4. The method of claim 1, at least one of the creating steps comprising blocking out a path in the corresponding permanent open cavity mold, the path being dimensioned to create a magazine release button channel.

5. The method of claim 4, the fusing of the right and left side poured replicas resulting in a fused replica with the magazine release button channel, and the method further comprising inserting a magazine release button into the magazine release button channel.

6. The method of claim 5, the method further comprising:
    providing a training magazine that is dimensioned for insertion into the magazine well of the fused replica, the training magazine being insertable into the magazine well, releasable from the magazine well, and replaceable;
    the magazine release button and the training magazine comprising respective mating features that engage to lock the training magazine in the magazine well unless the magazine release button is activated.

7. The method of claim 1,
the step of creating the first permanent open cavity mold comprising blocking out a first path in the first permanent open cavity mold that is dimensioned to create a right side of a magazine release button channel;
the step of creating the second permanent open cavity mold comprising blocking out a second path in the second permanent open cavity mold that is dimensioned to create a left side of the magazine release button channel.

8. The method of claim 7,
the fusing of the right and left side poured replicas resulting in a fused replica with the magazine release button channel; and
the method further comprising inserting a magazine release button into the magazine release button channel.

9. The method of claim 8, the magazine release button comprising a right side, a left side, and a shaft joining the right and left sides of the magazine release button, and the step of inserting the magazine release button comprising:
inserting the right side of the magazine release button into the right side of the magazine release button channel through a right side of the fused replica;
inserting the left side of the magazine release button into the left side of the magazine release button channel through a left side of the fused replica; and
joining the right and left sides of the magazine release button with the shaft.

10. The method of claim 9,
the magazine release button further comprising a spring surrounding or adjacent to the shaft;
the step of creating the first permanent open cavity mold further comprising leaving an opening across a part of the first path, or the step of creating the second permanent open cavity mold further comprising leaving an opening across a part of the second path;
the opening across the part of the first or the second path resulting in a barrier across the magazine release button channel of the fused replica; and
the shaft extending through the barrier, but the spring being restrained on one side of the barrier;
wherein pressing one side of the magazine release button will compress the spring, biasing it to restore the magazine release button to its initial position when the magazine release button is released.

11. The method of claim 9, the method further comprising:
providing a training magazine that is dimensioned for insertion into the magazine well of the fused replica, the training magazine being insertable into the magazine well, releasable from the magazine well, and replaceable;
the magazine release button comprising a projection;
the training magazine comprising an indentation that is positioned and dimensioned to engage with the projection to lock the training magazine in the magazine well unless the magazine release button is activated.

12. The method of claim 1 further comprising:
forming a training magazine that is dimensioned for insertion into the magazine well of a fused replica resulting from the fusing of the right and left side poured replicas, the training magazine being insertable into the magazine well, releasable from the magazine well, and replaceable.

13. The method of claim 12, the forming step comprising:
creating a training magazine mold of the magazine or of the replica of the magazine;
pouring a training magazine material into the training magazine mold and letting the training magazine material harden to form the training magazine.

14. The method of claim 13, the training magazine material comprising a polymer.

15. The method of claim 13, the forming step further comprising:
inserting a weight into the training magazine mold.

16. The method of claim 15, the weight comprising a metal.

17. The method of claim 1, further comprising:
inserting a weight into one of the first and second permanent open cavity molds.

18. The method of claim 17, the weight comprising a metal.

19. The method of claim 1, the material comprising a polymer.

20. The method of claim 1, the material being a distinctive color that identifies a fused replica, resulting from the fusing of the right and left side poured replicas, as being a training firearm.

* * * * *